United States Patent
Mizuno et al.

(10) Patent No.: US 7,358,463 B2
(45) Date of Patent: Apr. 15, 2008

(54) SWITCHING POWER SUPPLY AND METHOD FOR STOPPING SUPPLY OF ELECTRICITY WHEN ELECTRICITY OF SWITCHING POWER SUPPLY EXCEEDS RATED ELECTRICITY

(75) Inventors: Takafumi Mizuno, Kariya (JP); Kota Otoshi, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 414 days.

(21) Appl. No.: 11/202,760

(22) Filed: Aug. 12, 2005

(65) Prior Publication Data
US 2007/0045286 A1 Mar. 1, 2007

(51) Int. Cl.
*H05B 1/02* (2006.01)
(52) U.S. Cl. .............. 219/497; 219/494; 219/507; 219/501; 219/492; 374/103
(58) Field of Classification Search ............. 219/494, 219/497, 492, 507, 501, 505, 499; 374/102, 374/103; 307/117
See application file for complete search history.

(56) References Cited

U.S. PATENT DOCUMENTS 3,566,143 A * 2/1971 Paine et al. ............ 307/126
4,496,829 A * 1/1985 Black et al. ............ 219/497
7,233,112 B2 * 6/2007 Burke et al. ............ 315/209 R

FOREIGN PATENT DOCUMENTS

JP 2003-014552 1/2003

* cited by examiner

*Primary Examiner*—Mark Paschall
(74) *Attorney, Agent, or Firm*—Morgan & Finnegan, L.L.P.

(57) ABSTRACT

A switching power supply includes a sensor for detecting that the output level of the switching power supply has exceeded a rated output level, and a memory that stores data for estimating temperature change of a heat-producing component during a period in which the output level is higher than the rated output level. The data is differentiation data of a curve that represents temperature change characteristics of the heat-producing component. An estimated temperature of the heat-producing component is computed based on the time elapsed from when the output level of the switching power supply exceeds the rated output level and the differentiation data. When the estimated temperature of the heat-producing component reaches an upper threshold temperature, a switching element is deactivated.

14 Claims, 9 Drawing Sheets

SWITCHING POWER SUPPLY AND METHOD FOR STOPPING SUPPLY OF ELECTRICITY WHEN ELECTRICITY OF SWITCHING POWER SUPPLY EXCEEDS RATED ELECTRICITY

BACKGROUND OF THE INVENTION

The present invention relates to a switching power supply that supplies electricity required by a load device to the load device by switching switching elements, and to a method for stopping supply of electricity from the switching power supply to the load device.

As a type of switching power supply, DC-AC inverters are known that permit a vehicle battery to be used as a power supply for household electric appliances. Electrical components in such a switching power supply include passive components the temperature of which does not increase when the switching power supply is used with electricity less than or equal to the rated electricity level and increases when the switching power supply is used with electricity that exceeds the rated electricity level.

Japanese Laid-Open Patent Publication No. 2003-14552 discloses a temperature detecting device for preventing an electric motor and a power transistor from being damaged while operating at an overload. Specifically, the temperature detecting device accurately detects the operating temperature of a heat-producing portion of the electric motor without a temperature sensor attached to that portion. In the temperature detecting device, a first portion at which the temperature is detected is set, and a second portion is set in the vicinity of the first portion. Also, a third portion is set at a position in the vicinity of the first portion. The third portion is farther from the first portion than the second portion is from the first portion. A temperature sensor is provided in the third portion. The operation temperature T1<k>; at the first portion is successively calculated using the following three expressions.

$$T1'<k> = (1/C1') \times \{P<k> - (1/R1') \times (T1'<k-1> - T2'<k-1>)\} \times \Delta t + T1'<k-1>$$

$$T2'<k> = (1/C2') \times \{(1/R1') \times (T1'<k-1> - T2'<k-1>) - (1/R2') \times T2'<k-1>\} \times \Delta t + T2'<k-1>$$

$$T1<k> = T1'<k> + Tm<k>$$

R1': the thermal resistance constant of a portion extending between and including the first portion to the second portion R2': the thermal resistance constant of a portion extending between and including the second portion to the third portion C1': the thermal capacity constant of a portion extending between and including the first portion to the second portion C2': the thermal capacity constant of a portion extending between and including the second portion to the third portion P<k>: estimated heat value Tm<k>: output of temperature sensor T1'<k>: difference between the operation temperature and the temperature sensor output T1'<k-1>: difference between the operation temperature and the temperature sensor output at a time $\Delta t$ before T2'<k>: difference between the temperature at the second portion and the temperature sensor output T2'<k-1>: difference between the temperature at the second portion and the temperature sensor output at a time $\Delta t$ before In the above described temperature detecting device, the temperature sensor is located at a position that is a little separated from the portion where the temperature should be detected. Therefore, even if the environmental temperature changes, the change is compensated for by the output of the temperature sensor. The temperature detecting device can be applied to an apparatus used in a greatly changing temperature environment. Also, since the temperature at the portion where the temperature should be detected and the output of the temperature sensor is calculated, the range of a modeled thermal equivalent network can be reduced. This reduces errors in temperature calculations. However, in the temperature detecting device, the operation temperature T1<k> needs to be successively calculated using the three expressions at every predetermined interval, which adds to the processing load. Also, errors can accumulate. Further, in the temperature detecting device, the four constants, which are the thermal capacity constants and the thermal resistance constants, need to be accurately and separately identified.

SUMMARY OF THE INVENTION

Accordingly, it is an objective of the present invention to stop supply of electricity to a load device before heat-producing portions are damaged when a switching power supply is switched with electricity exceeding the rated electricity level.

To achieve the above objective, the present invention provides a switching power supply including a switching element that performs switching for supplying electricity required by a load device to the load device, and a heat-producing component the temperature of which increases while the output level of the switching power supply is higher than a rated output level. The switching power supply includes a memory, a sensor, an estimated temperature computation section, a determination section, and a control section. The memory stores data for estimating temperature change of the heat-producing component during a period in which the output level of the switching power supply is higher than the rated output level. The sensor detects that the output level of the switching power supply has exceeded the rated output level. The estimated temperature computation section computes an estimated temperature of the heat-producing component by using the time elapsed from when the output level of the switching power supply exceeds the rated output level and the data stored in the memory. The determination section determines whether the estimated temperature of the heat-producing component has reached a predetermined upper threshold temperature. The control section controls the switching element to stop switching when the estimated temperature of the heat-producing component is determined to have reached the upper threshold temperature.

The present invention provides another switching power supply including a switching element that performs switching for supplying electricity required by a load device to the load device, and a heat-producing component the temperature of which increases while the output level of the switching power supply is higher than a rated output level. The switching power supply includes a sensor, an elapsed time measuring section, a determination section, and a control section. The sensor detects when the output level of the switching power supply has exceeded the rated output level. The elapsed time measuring section measures the time elapsed from when the output level of the switching power supply exceeds the rated output level. The determination section determines whether the elapsed time has reached a reference time. The control section controls the switching element to stop switching when the elapsed time is determined to have reached the reference time.

The present invention also provides a method for stopping supply of electricity from a switching power supply including a switching element that performs switching for supplying electricity required by a load device to the load device, and a heat-producing component the temperature of which increases while the output level of the switching power supply is higher than a rated output level. The method includes: preparing in advance data for estimating temperature change of the heat-producing component during a period in which the output level of the switching power supply is higher than the rated output level; detecting that the output level of the switching power supply has exceeded the rated output level; computing, when the output level of the switching power supply has exceeded the rated output level, an estimated temperature for the heat-producing component by using the time elapsed from when the output level of the switching power supply exceeds the rated output level and the data; determining whether the estimated temperature of the heat-producing component has reached a predetermined upper threshold temperature; and controlling the switching element to stop switching when the estimated temperature of the heat-producing component is determined to have reached the upper threshold temperature.

BRIEF DESCRIPTION OF THE DRAWINGS

The characteristics of the present invention that are believed to be novel will be made clear by the attached claims. The invention, together with objects and advantages thereof, may best be understood by reference to the following description of the presently preferred embodiments together with the accompanying drawings in which:

DETAILED DESCRIPTION OF THE PREFERRED EMBODIMENTS

An inverter 11 for a vehicle according to a first embodiment of the present invention will now be described with reference to the attached drawings.

Figure 1:
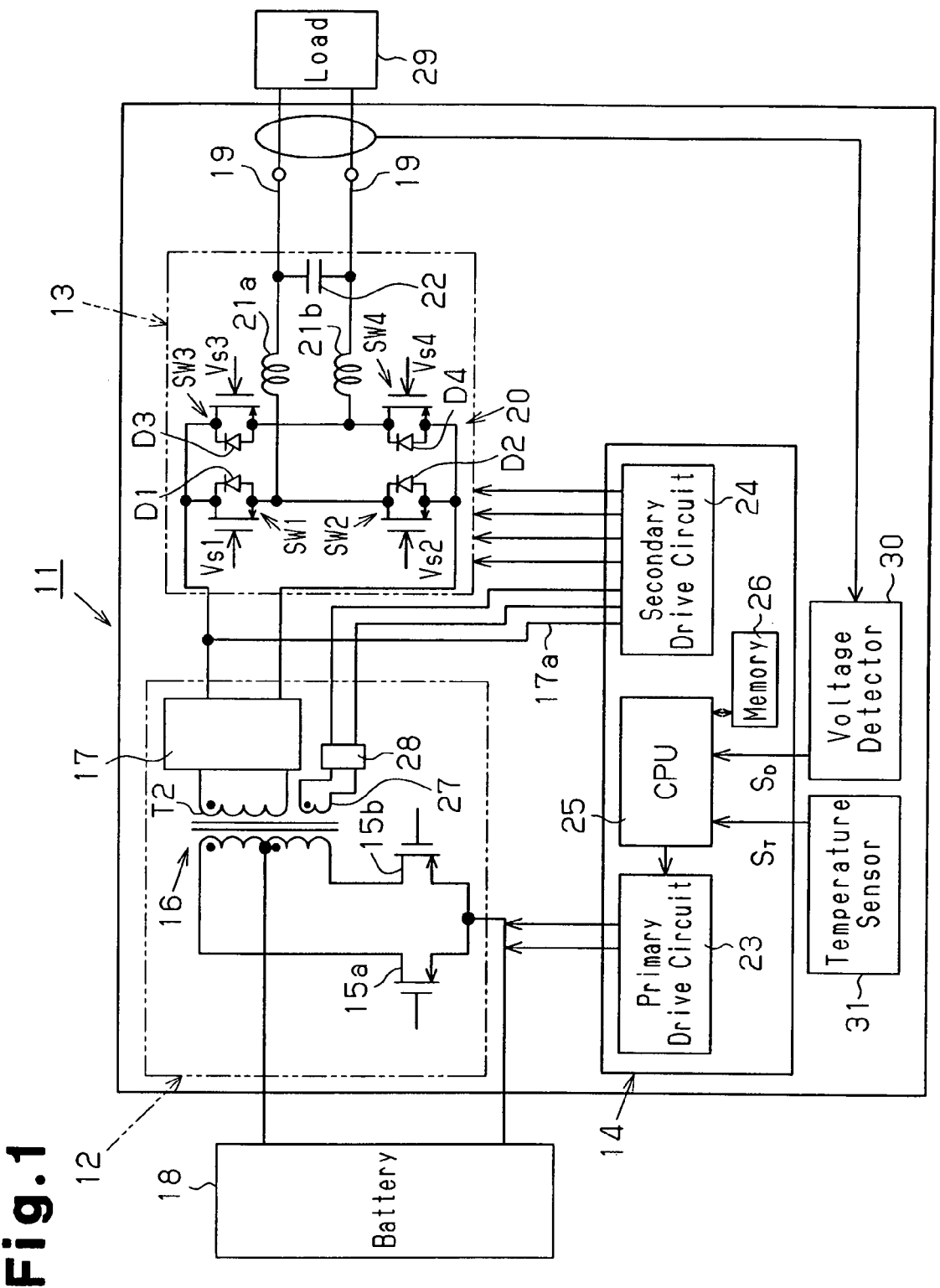
FIG. 1 is a circuit diagram illustrating an inverter according to one embodiment of the present invention.

As shown in FIG. 1, a switching power supply, which is an inverter 11, includes a DC-DC converter 12, a DC-AC inverter section 13, and a controller 14. The DC-DC converter 12 includes a pair of switching elements 15a, 15b, a step-up transformer 16, and a rectifier circuit 17. The DC-DC converter 12 is connected to a power supply, which is an on-vehicle battery 18, at the primary side of the step-up transformer 16, and converts the battery voltage to a direct-current voltage higher than the battery voltage. The battery 18 produces a voltage of 12V. The switching elements 15a, 15b are formed of n-channel MOSFETs.

The DC-AC inverter section 13 is connected to an output side, which is a secondary side of the DC-DC converter 12. The DC-AC inverter section 13 converts direct current from the DC-DC converter 12 to an alternating-current voltage of 60 Hz, 120V, and outputs the alternating-current voltage to output terminals 19. That is, the inverter 11 forms an AC inverter that converts direct current to alternating current and outputs the alternating current. The DC-AC inverter section 13 has an H bridge circuit 20 including four switching elements SW1 to SW4. Each of the switching elements SW1 to SW4 is formed of an n-channel MOSFET. In the H bridge circuit 20, the first and third switching elements SW1, SW3 are connected to the positive terminal of the rectifier circuit 17, and the second and fourth switching elements SW2, SW4 are connected to the negative terminal of the rectifier circuit 17. Diodes D1, D2, D3, D4 are each connected in antiparallel to one of the switching elements SW1, SW2, SW3, SW4. The output section of the H bridge circuit 20 is connected to coils (reactors) 21a, 21b and a capacitor 22, which form a filter.

The controller 14 includes a primary drive circuit 23, a secondary drive circuit 24, a CPU 25 and a memory 26. The memory 26 stores control programs for activating the DC-DC converter 12. The controller 14 controls the DC-DC converter 12 through the primary drive circuit 23, and controls the DC-AC inverter section 13 by means of the secondary drive circuit 24.

Power supply to the secondary drive circuit 24 is provided through a rectifier circuit 28 connected to a tertiary coil 27 provided at the secondary side of the step-up transformer 16. Normally, to stop alternating current outputted from the inverter 11, a drive signal from the CPU 25 to the primary drive circuit 23 is turned OFF, and the switching elements 15a, 15b are both turned OFF. As a result, the voltage produced by the tertiary coil 27 disappears, so that the power supply to the secondary drive circuit 24 is stopped and the drive signal to the secondary drive circuit 24 is stopped. The output of the DC-AC inverter section 13 is thus stopped.

Control terminals of the first and third switching elements SW1, SW3 (in this embodiment, MOSFET gates) receive first and third drive signals Vs1, Vs3 from the secondary drive circuit 24, respectively. Control terminals for the second and fourth switching elements SW2, SW4 receive second and fourth drive signals Vs2, Vs4 from the secondary drive circuit 24, respectively. In response to the frequency 60 Hz of commercial alternating current, the secondary drive circuit 24 generates the first to fourth drive signals Vs1 to Vs4 and sends the signals Vs1 to Vs4 to the switching elements SW1 to SW4 in such a manner that the combination of the switching element SW1 and the switching element SW4, and the combination of the switching element SW2 and the switching element SW3 are alternately and repeatedly turned ON and OFF.

To detect the output voltage of the rectifier circuit 17, the secondary drive circuit 24 is connected to a positive terminal of the rectifier circuit 17 through a lead 17a. The secondary drive circuit 24 detects the output voltage of the rectifier circuit 17 by means of an unillustrated sensor, and adjusts the ON duty of the switching elements SW1 to SW4. When the output voltage of the rectifier circuit 17 is high, the secondary drive circuit 24 controls switching elements SW1 to SW4 to lower the ON duty, so that the effective value of the AC voltage sent to the output terminals 19 reaches a predetermined value. However, when the rectifier circuit 17 outputs a voltage that is greater than or equal to a predetermined threshold voltage, the secondary drive circuit 24 generates the first to fourth drive signals Vs1 to Vs4 and sends the signals Vs1 to Vs4 to the switching elements SW1 to SW4, thereby turning OFF the switching elements SW1 to SW4. That is, when there is an abnormality, the drive signals Vs1 to Vs4 from the secondary drive circuit 24 are turned OFF, and the alternating current from the inverter 11 is stopped.

The memory 26 stores data for estimating temperature rise and temperature drop of a heat-producing component that needs to be protected when the output level of the inverter 11 exceeds a rated output level. Such a heat-producing component is exemplified, for example, by the coils 21A, 21B. The temperature of the coil $21a$, $21b$, which are passive elements, does not increase when the inverter 11 outputs alternating current at an output level less than or equal to the rated output level since the heat value of the coils $21a$, $21b$ is balanced with the radiant quantity to the ambient heat. On the other hand, when the inverter 11 outputs an alternating current of an output level greater than the rated output level, the temperature of the heat-producing components (coils $21a$, $21b$) increases. In this embodiment, the memory 26 stores, as the data, differentiation data as a table that shows curves (temperature rise curve and temperature drop curve) representing the temperature property of the heat-producing component when the output level of the inverter 11 exceeds the rated output level.

Figure 2:
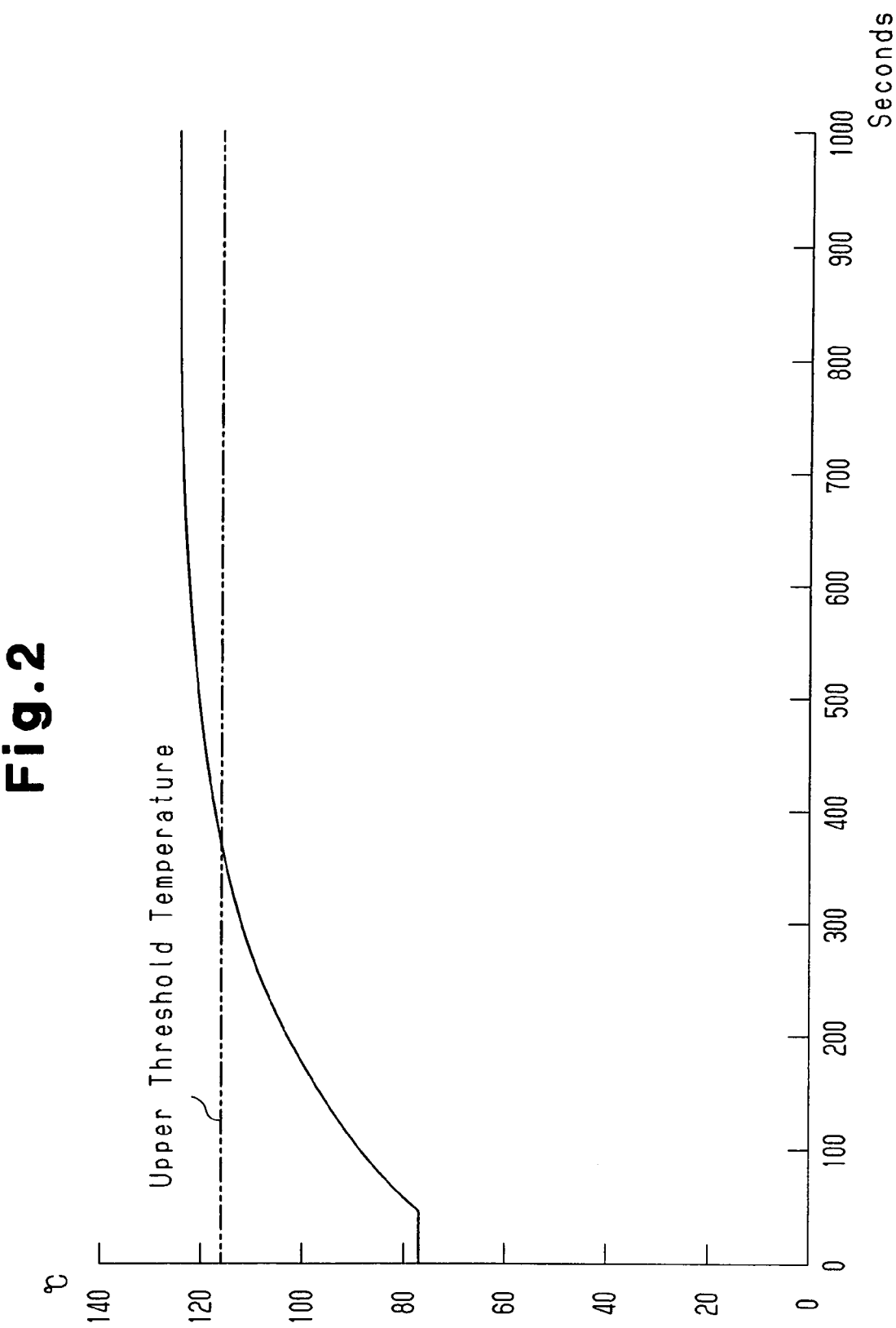
FIG. 2 is a graph showing the temperature rise curve for a heat-producing component.

The shape of the temperature rise curve, that is, the change property of temperature increase, varies depending on the load generated in the load device 29 connected to the output terminals 19. FIG. 2 shows the temperature rise curve of the heat-producing component in a state where an electricity level double the rated output is outputted in a case where the rated output of the inverter 11 is 400 W, and an upper threshold temperature. Also, FIG. 3 shows the temperature drop curve from when the temperature of the heat-producing component reaches the upper threshold temperature and the supply of electricity to the load device 29 is stopped, and a lower threshold temperature.

In FIG. 2, the temperature of the heat-producing component is substantially constant at 77° C. from when the temperature of the heat-producing component starts increasing to when 45 seconds has elapsed. The reason for this is as follows. The temperature of the heat-producing component is equal to the environmental temperature when the output of the inverter 11 is equal to the rated output. Even if the environmental temperature is a little different, the temperature of the heat-producing component reaches approximately 77° C. forty-five seconds after starting to increase. Since the temperature of 77° C. is lower than the lowest possible value of the upper threshold temperature, setting the temperature to a constant value of 77° C. until forty-five seconds after the start of the temperature increase does not cause any problems in the control procedure. Also, setting the temperature to a constant value facilitates computation for estimating the temperature of the heat-producing component.

Figure 3:
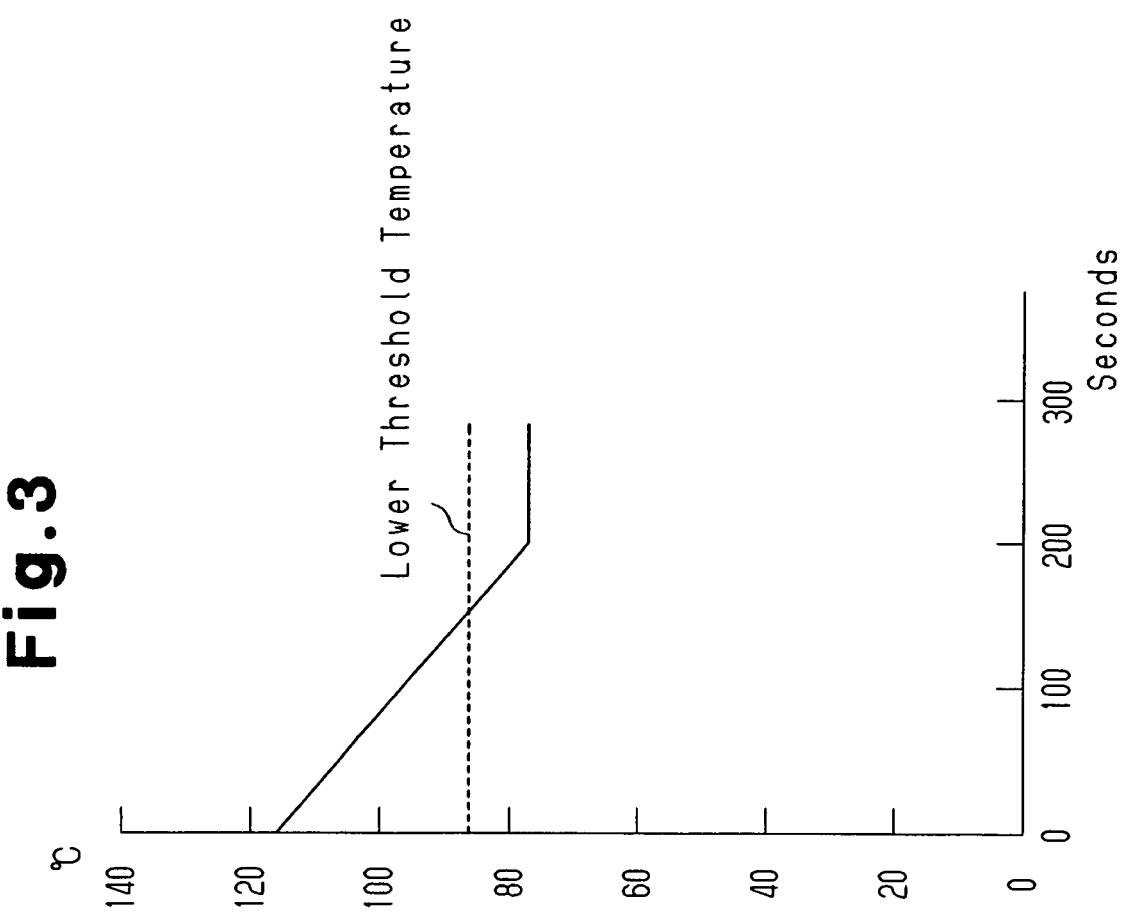
FIG. 3 is a graph showing the temperature drop curve for a heat-producing component.

The memory 26 stores differentiation data of for the temperature rise curve of FIG. 2 and the temperature drop curve of FIG. 3. However, the temperature change characteristics for temperature rise vary depending on the output level of the inverter 11. Therefore, based on the differentiation data of the temperature rise curve stored in the memory 26, the CPU 25 changes the increase rate of the temperature rise curve by a predetermined ratio that corresponds to the output electricity, thereby acquiring a temperature rise curve corresponding to the output electricity. Like the temperature rise curve of FIG. 2, the acquired temperature rise curve has its increase starting temperature (point of origin) at 77° C. The CPU 25 estimates the temperature of the heat-producing component using the differentiation data of the acquired temperature rise curve.

Figure 4:
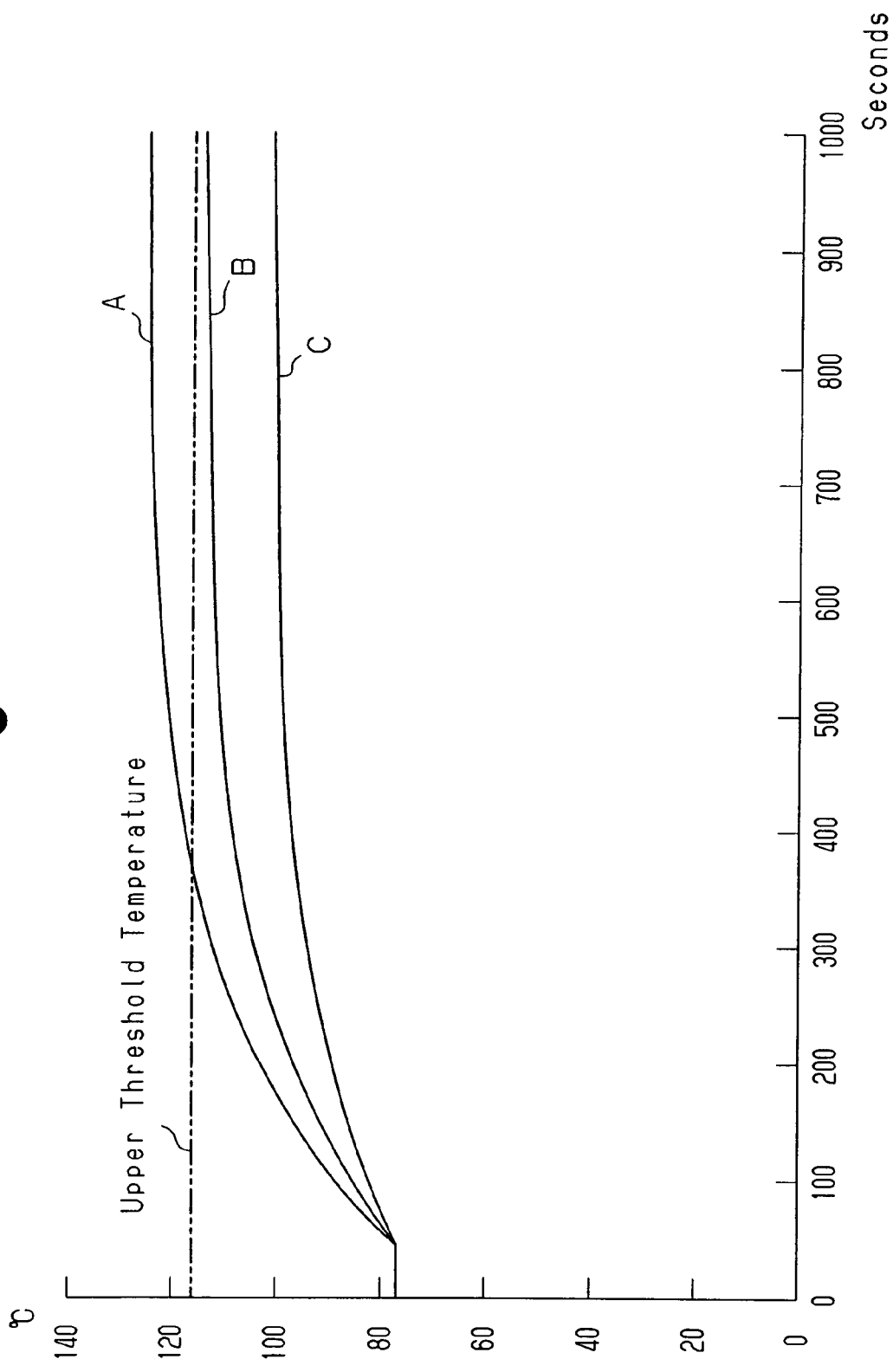
FIG. 4 is a graph showing temperature rise curves when the output electricity of the inverter varies.

FIG. 4 shows the temperature rise curve of FIG. 2 and a temperature rise curve acquired by changing the rate of increase of the curve of FIG. 2 by a predetermined ratio. In FIG. 4, line A is a reference temperature rise curve (that is, the temperature rise curve shown in FIG. 2), line B is a temperature rise curve acquired by reducing the increase rate of the reference temperature rise curve A to 75%, line C is a temperature rise curve acquired by reducing the increase rate of the reference temperature rise curve A to 50%. The temperature rise curve A is used when the output voltage of the inverter 11 is greater than or equal to 800 W. The temperature rise curve B is used when the output voltage of the inverter 11 is not less than 600 W and less than 800 W. The temperature rise curve C is used when the output voltage of the inverter 11 is not less than 400 W and less than 600 W. The temperature rise curve B and the temperature rise curve C do not reach the upper threshold temperature of 116° C. if the environment remains the same.

When using the temperature rise curve B and the temperature rise curve C, the CPU 25 estimates the temperature using the differentiation data of the temperature rise curve B and the temperature rise curve C from the start of the temperature increase until the temperature change rate becomes 0.002° C./2.34 seconds. After the temperature change rate becomes 0.002° C./2.34 seconds, the CPU 25 estimates the temperature using the rate of 0.002° C./2.34 seconds as the differentiation data. 2.34 seconds is the control cycle.

The inverter 11 includes a voltage detector 30 that detects the output voltage of the output terminals 19. The voltage detector 30 functions as a sensor that detects that the output level of the inverter 11 exceeds the rated output level. The inverter 11 includes a temperature sensor 31 that detects an initial temperature as the environmental temperature. The temperature sensor 31 is provided in the vicinity of the switching elements SW1 to SW4 and detects the temperature in the vicinity of the switching elements SW1 to SW4 as an initial temperature. The temperature sensor 31 is located, for example, at a heat sink (not shown) for the switching elements SW1 to SW4.

The CPU 25 receives a detected signal $S_D$ from the voltage detector 30 and a detected signal $S_T$ from the temperature sensor 31. Using the time elapsed from when the output level of the inverter 11 exceeds the rated output level, the temperature rise curves stored in the memory 26, and the differentiation data of the temperature drop curve, the CPU 25 functions as an estimated temperature computation section that computes an estimated temperature for the heat-producing component. In response to an output level that exceeds the rated level, the CPU 25 directly adopts a value on the differentiation table. Also, the CPU 25 computes an estimated temperature for the heat-producing component based on the temperature rise curve that has been changed to the temperature rise curves B, C.

The CPU 25 determines whether the estimated temperature of the heat-producing component has reached the predetermined upper threshold temperature. Continuation of a temperature greater than a certain value damages the heat-producing component. The upper threshold temperature is lower than the certain temperature that damages the component. The CPU 25 also functions as a determination section that determines whether the estimated temperature of the heat-producing component has reached the predetermined upper threshold temperature.

When determining that the estimated temperature of the heat-producing component has reached the predetermined upper threshold temperature, the CPU 25 turns the drive signal to the primary drive circuit OFF. Accordingly, power supply to the secondary drive circuit 24 is stopped, and the drive signals Vs1 to Vs4 from the secondary drive circuit 24 are turned OFF. The CPU 25 forms a control section that controls the switching elements SW1 to SW4 to stop the switching elements SW1 to SW4 when determining that the estimated temperature of the heat-producing component has reached the upper threshold temperature.

After turning the drive signal to the primary drive circuit 23 OFF, that is, after stopping switching of the switching elements SW1 to SW4, the CPU 25 turns the drive signal to the primary drive circuit ON when the estimated temperature of the heat-producing component becomes the lower threshold temperature. Switching of the switching elements SW1 to SW4 is resumed by the drive signals Vs1 to Vs4 from the secondary drive circuit 24. Thereafter, when the estimated temperature reaches the upper threshold temperature, the CPU 25 turns the drive signal to the primary drive circuit 23 OFF, thereby stopping switching of the switching elements SW1 to SW4.

Operation of the above described inverter 11 will now be described with reference to FIGS. 5 and 8.

Figure 5:
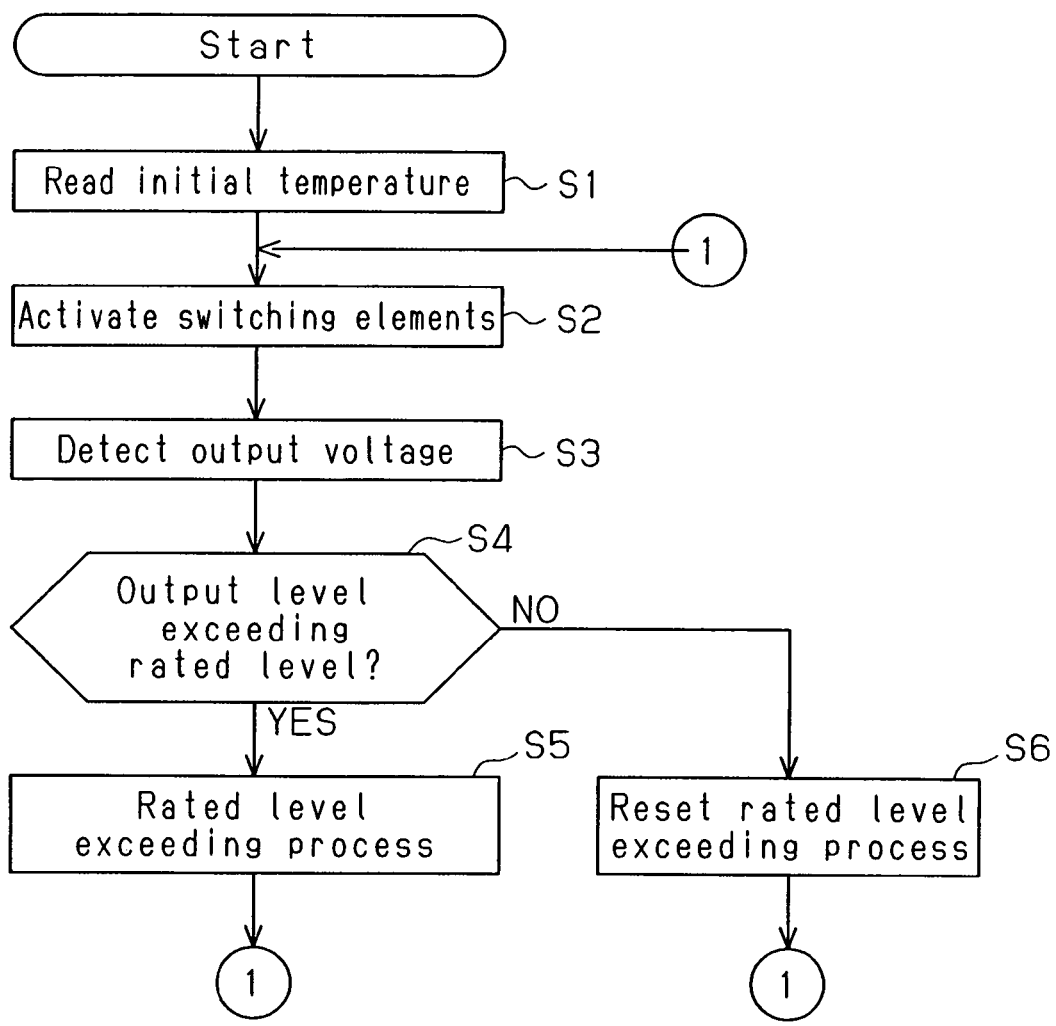
FIG. 5 is a flowchart showing a procedure for activating switching elements.

When an activation switch of the inverter 11 is turned on, the CPU 25 executes the flowchart of FIG. 5 at a constant cycle (for example, several tens of milliseconds). The CPU 25 executes flowcharts of FIG. 6 and FIG. 7 at a predetermined cycle (for example, 2.34 seconds) in an interrupting manner.

The CPU 25 reads the initial temperature from the detected signal $S_T$ of the temperature sensor 31 at step S1. The initial temperature is stored in an unillustrated RAM (random access memory). The initial temperature is assumed to be the temperature of the heat-producing component in a state where the inverter 11 is operating within the rated level.

Next, the CPU 25 activates the switching elements 15a, 15b at step S2. When the switching elements 15a, 15b are alternately turned ON and OFF by the CPU 25 through the primary drive circuit 23, alternating-current voltage that is higher than the voltage of the battery 18 is produced in a secondary coil T2 of the step-up transformer 16. The alternating-current voltage is converted into direct-current voltage that is boosted by the rectifier circuit 17 with the voltage of the battery 18.

The switching elements SW1 to SW4 of the H bridge circuit 20 of the DC-AC inverter section 13 are activated through the secondary drive circuit 24. That is, at the frequency of 60 Hz of commercial alternating current, the combination of the switching element SW1 and the switching element SW4, the combination of the switching element SW2 and the switching element SW3 are alternately turned ON and OFF.

Figure 8:
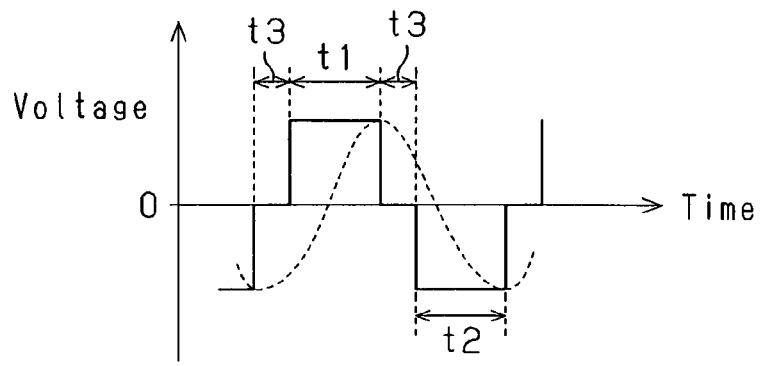
FIG. 8 is a diagram showing the relationship between the ON/OFF timing of a switching element and the waveform of output voltage.

More specifically, as shown in FIG. 8, the secondary drive circuit 24 outputs the first to fourth drive signals Vs1 to Vs4 in such a manner that a period t1 in which the switching element SW1 and the switching element SW4 are turned ON, and a period t2 in which the switching element SW2 and the switching element SW3 are turned ON are repeated at an interval of a period t3. That is, the switching elements SW1 to SW4 repeat the following operation shown in the table 1 below in each of the periods.

TABLE 1

|  | SW1 | SW2 | SW3 | SW4 |
| --- | --- | --- | --- | --- |
| period t1 | ON | OFF | OFF | ON |
| period t2 | OFF | ON | ON | OFF |
| period t3 | OFF | OFF | OFF | OFF |

The waveform outputted by the H bridge circuit 20 contains harmonics. The harmonics are removed by the coils 21a, 21b and the capacitor 22, which form a filter, and the waveform shown by dotted line in FIG. 8 is outputted from the output terminals 19. As a result, the direct-current voltage supplied by the rectifier circuit 17 is converted into alternating-current voltage (120V) of a sine wave having a frequency (60 Hz) of commercial alternating current, and sent to the load device 29 connected to the output terminals 19.

Then, the CPU 25 receives the detected signal $S_D$ from the voltage detector 30 to detect the output voltage. At step S4, the CPU 25 determines whether the output level of the inverter 11 exceeds the rated output level based on the detected output voltage. When determining that the output level exceeds the rated output level, the CPU 25 performs a rated level exceeding process at step S5. Specifically, the CPU 25 sets a rated level exceeding flag and turns on a timer for measuring the time elapsed from when the rated level is exceeded. Thereafter, the CPU 25 returns to step S2. When determining that the output level does not exceed the rated output level, the CPU 25 resets the rated level exceeding process at step S6. Specifically, the CPU 25 clears the rated level exceeding flag and resets the timer. Thereafter, the CPU 25 returns to step S2.

Figure 6:
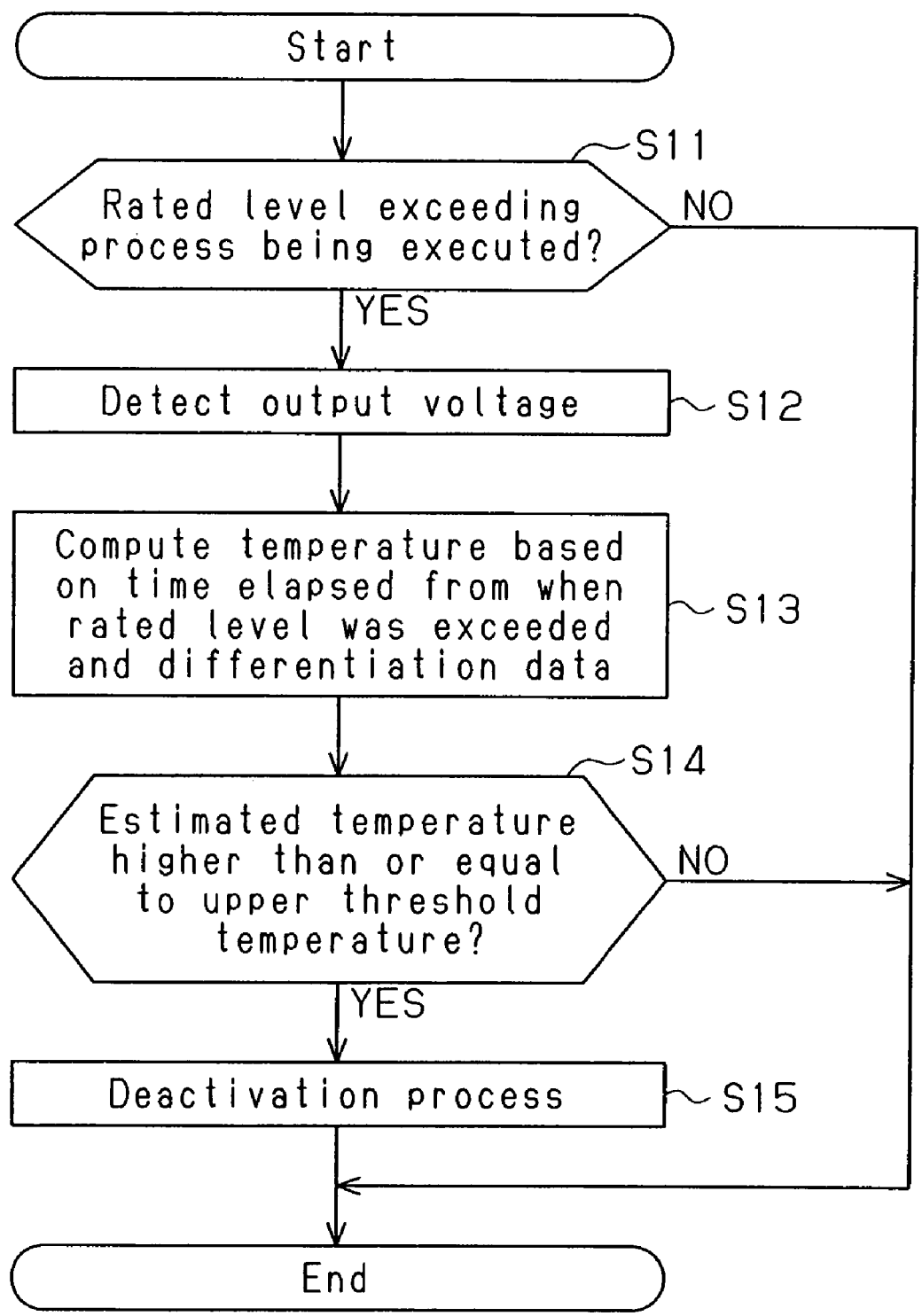
FIG. 6 is a flowchart showing a procedure for estimating temperature and stopping switching after a rated level is exceeded.

The CPU 25 executes the flowchart of FIG. 6 at a predetermined interval. At step S11, the CPU 25 determines whether the rated level exceeding process is being executed, more specifically, whether the rated level exceeding flag is set. When determining that the rated level exceeding process is being executed, the CPU 25 detects the output voltage at step S12, and then computes an estimated temperature for the heat-producing component at step S13. The CPU 25 computes the estimated temperature for the heat-producing component based on the time elapsed from when the rated level is exceeded and the differentiation data of the temperature rise that corresponds to the electricity computed based on the output voltage. When computing the estimated temperature, if the initial temperature is less than the increase start temperature of the temperature rise curve, the CPU 25 computes the estimated temperature using the increase start temperature as the reference temperature. If the initial temperature is higher than the increase start temperature, the CPU 25 computes the estimated temperature using the initial temperature as the reference temperature.

Next, the CPU 25 determines whether the estimated temperature is greater than or equal to the upper threshold temperature (for example, 116° C.) at step S14. When determining that the estimated temperature is greater than or equal to the upper threshold temperature, the CPU 25 executes a deactivation process at step S15. More specifically, the CPU 25 sets a deactivation flag and turns on a timer for measuring the time elapsed from deactivation. Thereafter, the CPU 25 executes a process for deactivating the DC-AC inverter section 13. That is, the CPU 25 turns OFF the drive signal to the primary drive circuit 23. As a result, the switching elements 15a, 15b are both turned OFF, and the voltage produced by the tertiary coil 27 disappears so that the power supply to the secondary drive circuit 24 is stopped. The secondary drive circuit 24 stops outputting the drive signal so that the DC-AC inverter section 13 stops outputting voltage.

When determining that the rated level exceeding process is not being executed at step S11, the CPU 25 ends the process. When determining that the estimated temperature is less than the upper threshold temperature at step S14, the CPU 25 ends the process. That is, unless the deactivation process of step S15 is executed, the CPU 25 continues executing the flowchart of FIG. 5.

Figure 7:
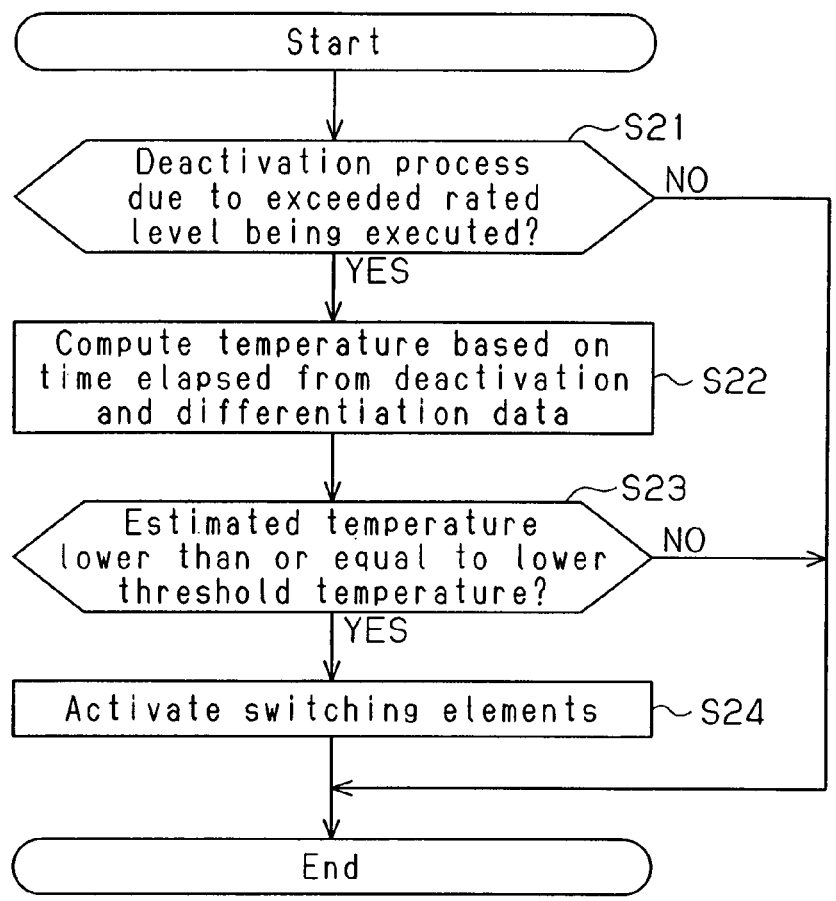
FIG. 7 is a flowchart showing a procedure for resuming temperature estimation and switching after deactivation due to a temperature rise.

The CPU 25 executes the flowchart of FIG. 7 at a predetermined interval. At step S21, the CPU 25 determines whether the deactivation process of the DC-AC inverter section 13 is being executed, more specifically, whether the deactivation flag is set. When determining that the deactivation process of the DC-AC inverter section 13 is being executed, the CPU 25 computes the estimated temperature of the heat-producing component based on the time elapsed from when the activation is stopped and the differentiation data at step S22.

At the point in time when the DC-AC inverter section 13 is deactivated at step S15 of FIG. 6, the temperature of the heat-producing component is equal to the upper threshold temperature. The temperature of the heat-producing component then drops along the drop curve from when the DC-AC inverter section 13 is deactivated. The CPU 25 determines whether the estimated temperature is less than or equal to the lower threshold temperature (for example, 86° C.) at step S23. When determining that the estimated temperature is less than or equal to the lower threshold temperature, the CPU 25 clears the deactivation flag at step S24 and resets the timer for measuring the time elapsed from deactivation. Thereafter, the CPU 25 resumes activation of the DC-DC converter 12, or the switching elements 15a, 15b. Accordingly, power supply to the secondary drive circuit 24 is resumed, and the drive signals Vs1 to Vs4 are outputted by the secondary drive circuit 24.

When determining that the DC-AC inverter section 13 is not deactivated at step S21, the CPU 25 ends the process. When determining that the estimated temperature is greater than the lower threshold temperature at step S23, the CPU 25 ends the process. That is, unless step S24 is executed, the supply of electricity from the inverter 11 continues being suspended.

Figure 9:
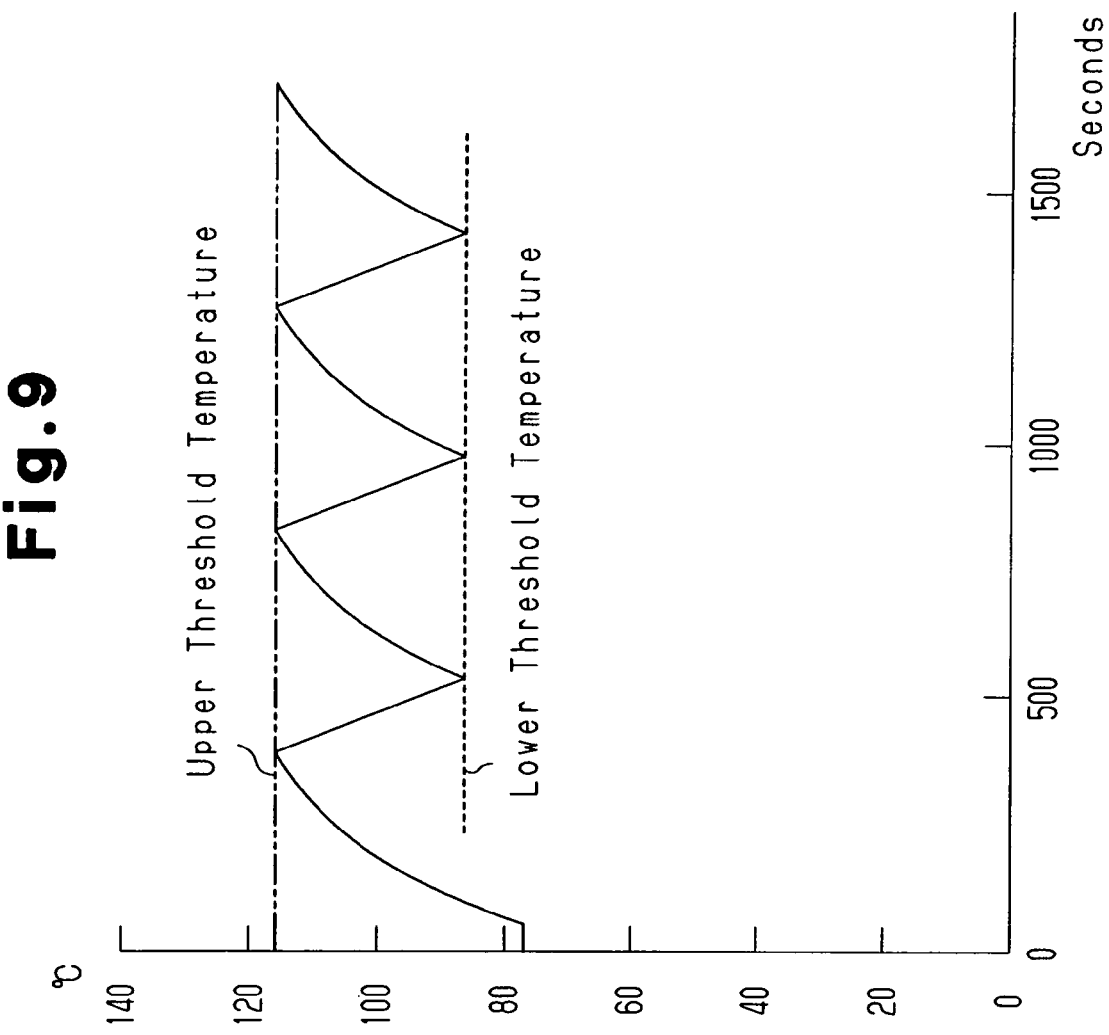
FIG. 9 is a graph showing temperature changes of a heat-producing component when connected to a load device that generates double the load of the rated load.

FIG. 9 shows changes of the estimated temperature in the case where the load device 29, which produces an electricity level that is double the rated output, is connected to the inverter 11. While the load device 29 is connected to the inverter 11, the DC-AC inverter section 13 is activated in a rated level exceeding state until the temperature of the heat-producing component reaches the upper threshold temperature. The DC-AC inverter section 13 is deactivated when the temperature of the heat-producing component reaches the upper threshold temperature. When the temperature of the heat-producing component drops and becomes equal to the lower threshold temperature, the DC-AC inverter section 13 is activated again. That is, in the rated level exceeding state, it is confirmed that electricity is intermittently supplied in a manner that does not damage the heat-producing component.

When the voltage at the output terminals 19 becomes lower than the predetermined threshold value, the CPU 25 turns the drive signal to the primary drive circuit 23 OFF based on the detected signal $S_D$ of the voltage detector 30. The voltage at the output terminals 19 becomes lower than the predetermined threshold value when the load of load device 29 is excessively high. That is, since the rate of increase of the temperature of the heat-producing component due to excessive load is not significantly high, an abnormality deactivation process executed based on a temperature increase of the heat-producing component when the excessive load is too high can damage the component before the deactivation process. The CPU 25 therefore turns the switching elements SW1 to SW4 OFF. As a result, the output voltage of the DC-AC inverter section 13 falls below the predetermined threshold value. When detecting this low voltage through the voltage detector 30, the CPU 25 turns the drive signal to the primary drive circuit 23 OFF. As a result, the switching elements 15a, 15b are both turned OFF, and the voltage produced by the tertiary coil 27 disappears so that the power supply to the secondary drive circuit 24 is stopped.

This embodiment provides the following advantages.

(1) The memory 26 is provided, which stores data for estimating temperature increase of the heat-producing component (coils 21a, 21b) to be protected while the output level of the inverter 11 exceeds the rated output level. Using the time elapsed from when the output level of the inverter 11 exceeds the rated output level and the data stored in the memory 26, an estimated temperature for the heat-producing component is computed. Then, the CPU 25 determines whether the estimated temperature of the heat-producing component has reached the upper threshold temperature. When the estimated temperature reaches the upper threshold temperature, the CPU 25 stops switching of the switching elements 15a, 15b of the DC-DC converter 12. Thus, even if the heat-producing component, the temperature of which is to be monitored, has a shape that hinders reliable temperature detection by the temperature sensor 31, or a shape to which the temperature sensor 31 is difficult to attach, switching is not continued to such an extent that the temperature is increased to a level that damages the heat-producing component when the DC-AC inverter section 13 of the inverter 11 is switched in a rated level exceeding state.

(2) When the inverter 11 supplies electricity in a rated level exceeding state, the controller 14 controls the switching elements SW1 to SW4 in such a manner that the temperature of the heat-producing component is maintained in the range between the upper threshold temperature and the lower threshold temperature. Therefore, electricity is intermittently supplied to the load device 29 in a state that does not damage the heat-producing component.

(3) Change in the temperature increase of the heat-producing component varies depending on the magnitude of the electricity outputted by the inverter 11. Based on the differentiation data that corresponds to the value of a single output level exceeding the rated output level, the CPU 25 makes an approximation of a proper temperature change that corresponds to the actual output level. Thus, even if a plurality of temperature rise curves that correspond to a plurality of output levels are not actually measured, switching of the switching elements 15a, 15b of the DC-DC converter 12 is properly controlled.

(4) The switching power supply is a DC-AC inverter that uses the vehicle battery 18 as a power supply and household electric appliances as load devices. Depending on the types of the appliances used, the load can significantly vary. However, the switching power supply is capable of dealing with temporary fluctuations of the load without any trouble.

(5) Since a sensor attached to the DC-AC inverter section 13 for measuring the temperature of the switching elements SW1 to SW4 or a sensor for measuring the environmental temperature is used as the temperature sensor 31, no additional temperature sensor needs to be provided.

A second embodiment of the present invention will now be described with reference to FIG. 10. The differences from the first embodiment will mainly be discussed.

Figure 10:
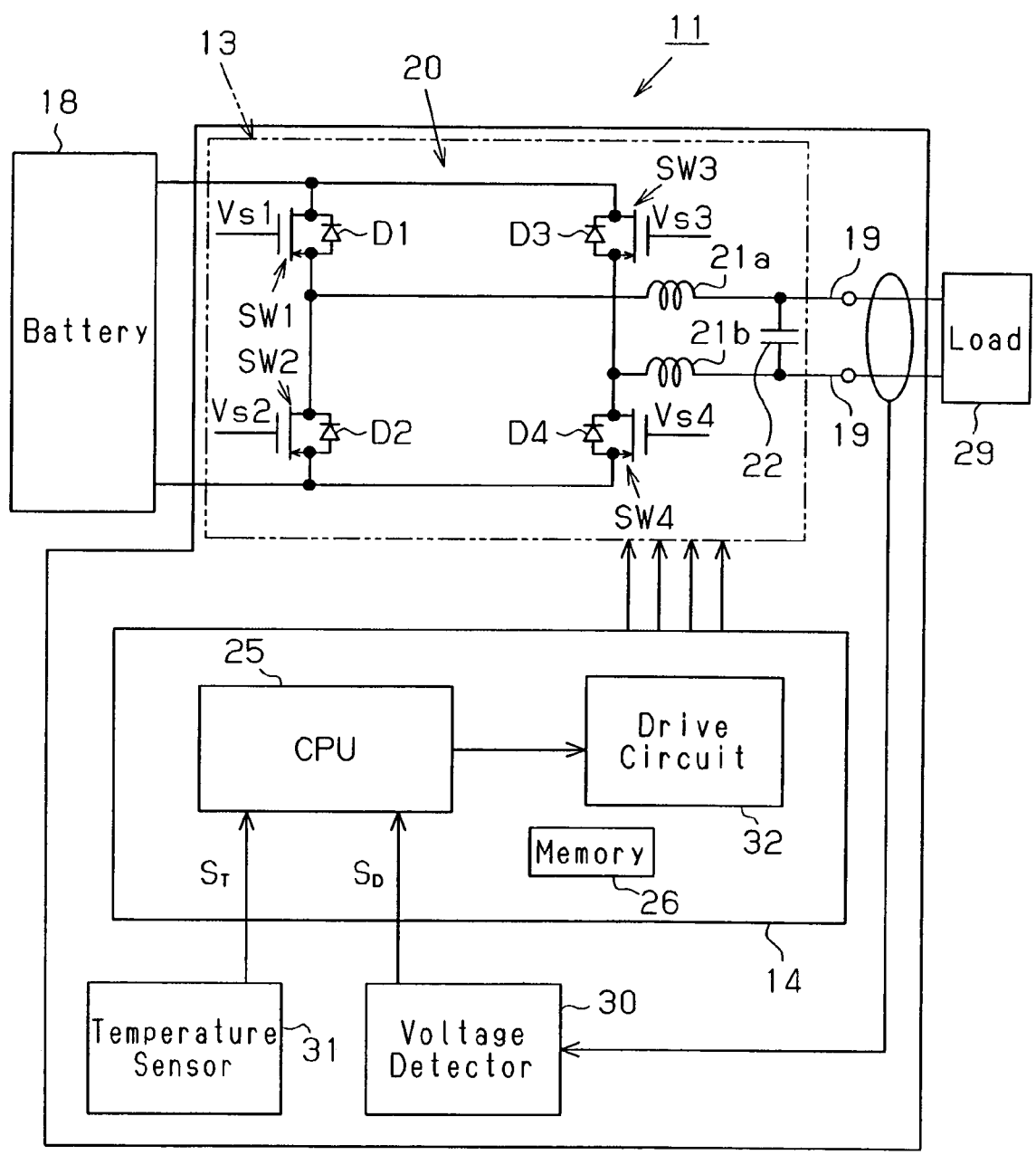
FIG. 10 is a circuit diagram illustrating an inverter according to another embodiment.

As shown in FIG. 10, an inverter 11 of the present embodiment does not have the DC-DC converter 12, and the DC-AC inverter section 13 is directly connected to the battery. The voltage of the battery 18 is higher than the voltage outputted by the DC-AC inverter section 13. The voltage of the battery 18 is higher than a commercial power supply of 120V, and is, for example, approximately 200V. The DC-AC inverter section 13 converts the battery voltage to an alternating-current voltage lower than the battery voltage.

The controller 14 has a drive circuit 32. The memory 26 stores control programs for activating the DC-AC inverter section 13. The controller 14 controls the DC-AC inverter section 13 through the drive circuit 32.

The CPU 25 controls the DC-AC inverter section 13 according to the flowcharts of FIGS. 5 to 7 in substantially the same manner as the first embodiment. This embodiment is different from the first embodiment in the following points. At step S2 of FIG. 5, the CPU 25 controls the switching elements SW1 to SW4 through the drive circuit 32 in the same manner as the secondary drive circuit 24 is controlled in the first embodiment. In a stop process in step S15 of FIG. 6, the CPU 25 sets a deactivation flag and activates a timer for measuring the time elapsed from the deactivation. Thereafter, the CPU 25 deactivates the switching elements SW1 to SW4 to deactivate the DC-AC inverter section 13. That is, the CPU 25 causes the drive circuit 32 to output drive signals Vs1 to Vs4 for turning all the switching elements SW1 to SW4 OFF. At step S24 of FIG. 7, the CPU 25 controls the switching elements SW1 to SW4 in the same manner as the secondary drive circuit 24 is controlled in the first embodiment.

In this embodiment, the DC-DC converter 12 is not provided, and direct current from the battery 18 is directly converted into alternating current of 120V by the DC-AC inverter section 13. This reduces the number of components of the inverter 11, and thus simplifies the configuration.

In the first embodiment, the temperature rise curve and the temperature drop curve are used as data for estimating temperature increase and temperature decrease of the heat-producing component to be protected. However, data that represents a temperature rise curve and a temperature drop curve may be stored in the memory 26, and the data of the temperature rise curve and the temperature drop curve may be directly used.

A temperature rise curve that is created by measuring temperature change from room temperature (20° C.) may be used.

The upper threshold temperature and the lower threshold temperature may be changed as necessary according to the type of heat-producing component.

In a state where the output level of the switching power supply exceeds the rated output level, temperature increase of the heat-producing component is substantially constant if the output level does not change by a great degree, and whether the temperature of the heat-producing component reaches the upper threshold temperature can be determined based on the time elapsed from when the output level exceeds the rated output level. Therefore, the CPU 25 may function as an elapsed time measuring section that measures the time elapsed from when the output level of the switching power supply exceeds the rated output level, a determination section that determines whether the elapsed time has reached a reference time, and a control section that stops switching of the switching elements when it is determined that the elapsed time has reached the reference time.

Further, whether the temperature has fallen to the lower threshold temperature can be determined based on the time elapsed from when the supply of electricity from the switching power supply is stopped. Therefore, in addition to the configuration for stopping switching of the switching elements according to the elapsed time from when the rated output level is exceeded, the CPU 25 may function as an elapsed time measuring section that measures the time elapsed from when switching is stopped, a determination section that determines whether the elapsed time has reached a reference time, and a control section that resumes switching of the switching elements when it is determined that the elapsed time has reached the reference time.

It may be configured that when the inverter 11 continues operating in a rated level exceeding state, and the estimated temperature of the heat-producing component reaches the upper threshold temperature, operation of the inverter 11 is stopped, and the inverter 11 starts operating again when a user performs an operation for starting the inverter 11.

As a sensor for detecting that the output level of the switching power supply exceeds the rated output level, a sensor for detecting current supplied to the load device may be provided instead of the voltage detector 30, which detects the output voltage. For example, a shunt resistor may be provided in a line that connects the second and fourth switching elements SW2, SW4 of the DC-AC inverter section 13 to the ground terminal of the battery 18, and a sensor may be provided that detects voltage that corresponds to current through the shunt resistor.

As a sensor for detecting that the output level of the switching power supply exceeds the rated output level, a sensor that detects the input current to the DC-AC inverter section 13 may be provided. For example, a shunt resistor may be provided in a line that connects the first and third switching elements SW1, SW3 of the DC-AC inverter section 13 to the ground terminal of the battery 18, and a sensor may be provided that detects voltage that corresponds to current through the shunt resistor.

As long as the protected heat-producing component is a passive element, it is not limited to the coils 21a, 21b. For example, the protected heat-producing component may be the coil of the step-up transformer 16 in the embodiment of FIG. 1.

The switching elements SW1 to SW4, which form the H bridge circuit 20, do not necessarily have to be n-channel MOSFETs. For example, the switching elements SW1 to SW4 may be IGBTs (Insulated Gate Bipolar Transistors).

The magnitude of the alternating-current voltage outputted by the DC-AC inverter section 13 is not limited to 120V, but may be other commercial voltage for household electric appliances (for example, 100V, 110V, and 200V). The frequency of the alternating current does not necessarily have to be 60 Hz, but may be 50 Hz.

Instead of a DC-AC inverter, the switching power supply may be applied to a DC-DC converter or an AC-DC converter.

The method for controlling the H bridge circuit 20 is not limited to the method in which the combination of the switching element SW1 and the switching element SW4, and the combination of the switching element SW2 and the switching element SW3 are alternately turned ON and OFF, thereby converting direct-current voltage into alternating current so that alternating-current voltage of a sine wave is sent to the output terminals 19. For example, a method may be employed in which one cycle of a commercial alternating current of 60 Hz is divided into a first half cycle and a latter half cycle. In the first half cycle, the switching element SW1 is held in an OFF state and the switching element SW2 is held in an ON state, and the switching element SW3 and the switching element SW4 are alternately turned ON and OFF at a predetermined control frequency (20 to 40 kHz). Also, it may be configured that, in the latter half cycle, the switching element SW3 is held in an OFF state and the switching element SW4 is held in an ON state, and the switching element SW1 and the switching element SW2 are alternately turned ON and OFF at a predetermined control frequency (20 to 40 kHz). The first half cycle and the latter half cycle are repeated. By adjusting the ON duty of the switching element SW3 in the first half cycle and the ON duty of the switching element SW1 in the latter half cycle according to a target voltage, alternating-current voltage of a sine wave is sent to the output terminals 19.

Although multiple embodiments have been described herein, it will be clear to those skilled in the art that the present invention may be embodied in different specific forms without departing from the spirit of the invention. The invention is not to be limited to the details given herein, but may be modified within the scope and equivalence of the appended claims.

The invention claimed is:

1. A switching power supply for supplying electricity to a load device, the switching power supply comprising: a switching element that performs switching for supplying electricity required by the load device, and a heat-producing component the temperature of which increases while the output level of the switching power supply is higher than a rated output level;
   a memory that stores data for estimating temperature change of the heat-producing component during a period in which the output level of the switching power supply is higher than the rated output level;
   a sensor for detecting that the output level of the switching power supply has exceeded the rated output level;
   an estimated temperature computation section that computes an estimated temperature for the heat-producing component by using the time elapsed from when the output level of the switching power supply exceeds the rated output level and the data stored in the memory;
   a determination section that determines whether the estimated temperature of the heat-producing component has reached a predetermined upper threshold temperature; and
   a control section that controls the switching element to stop switching when the estimated temperature of the heat-producing component is determined to have reached the upper threshold temperature.

2. The switching power supply according to claim 1, further comprising a temperature sensor for detecting environmental temperature, wherein the estimated temperature computation section computes the estimated temperature for the heat-producing component using the detected temperature as a starting point.

3. The switching power supply according to claim 1, wherein, while the output level of the switching power supply is higher than the rated output level, the control section controls the switching element to intermittently supply electricity to the load device in a state where the heat-producing component is not damaged.

4. The switching power supply according to claim 3, wherein, after controlling the switching element to stop switching, the control section controls the switching element to resume switching when the estimated temperature has dropped to a predetermined lower threshold temperature that is lower than the upper threshold temperature, and, thereafter, the control section controls the switching element to stop switching when the estimated temperature reaches the upper threshold temperature.

5. The switching power supply according to claim 1, wherein the data stored in the memory is differentiation data of a curve that represents temperature change characteristics of the heat-producing component during a period in which the output level of the switching power supply is higher than the rated output level.

6. The switching power supply according to claim 1, wherein the heat-producing component is a passive element.

7. The switching power supply according to claim 6, wherein the passive element is a coil.

8. The switching power supply according to claim 1, wherein the sensor detects output voltage from the switching power supply.

9. The switching power supply according to claim 1, wherein the switching power supply is a DC-AC inverter.

10. The switching power supply according to claim 9, wherein the switching power supply is mounted on a vehicle having a battery and converts electricity from the battery into a form that can be used by household electric appliances.

11. A switching power supply for supplying electricity to a load device, the switching power supply comprising: a switching element that performs switching for supplying electricity required by the load device, and a heat-producing component the temperature of which increases while the output level of the switching power supply is higher than a rated output level;
    a sensor for detecting that the output level of the switching power supply has exceeded the rated output level;
    an elapsed time measuring section that measures the time elapsed from when the output level of the switching power supply exceeds the rated output level;
    a determination section that determines whether the elapsed time has reached a reference time; and
    a control section that controls the switching element to stop switching when the elapsed time is determined to have reached the reference time.

12. A method for stopping supply of electricity from a switching power supply including a switching element that performs switching for supplying electricity required by a load device to the load device, and a heat-producing component the temperature of which increases while the output level of the switching power supply is higher than a rated output level, the method comprising:
    preparing in advance data for estimating temperature change of the heat-producing component during a period in which the output level of the switching power supply is higher than the rated output level;

detecting that the output level of the switching power supply has exceeded the rated output level;

computing, when the output level of the switching power supply has exceeded the rated output level, an estimated temperature for the heat-producing component by using the time elapsed from when the output level of the switching power supply exceeds the rated output level and the data;

determining whether the estimated temperature of the heat-producing component has reached a predetermined upper threshold temperature; and controlling the switching element to stop switching when the estimated temperature of the heat-producing component is determined to have reached the upper threshold temperature.

13. The method according to claim 12, further comprising:

preparing in advance data for estimating temperature change of the heat-producing component from when switching of the switching element is stopped;

measuring the time elapsed from when switching of the switching element is stopped;

computing, by using the elapsed time and the data, the estimated temperature for the heat-producing component in a state where switching is not being performed;

determining whether the estimated temperature of the heat-producing component has dropped to a predetermined lower threshold temperature that is lower than the upper threshold temperature; and resuming switching of the switching element when the estimated temperature of the heat-producing component is determined to have dropped to the lower threshold temperature.

14. The method according to claim 12, wherein the data is obtained by differentiating a curve that represents temperature change characteristics of the heat-producing component during a period in which the output level of the switching power supply is higher than the rated output level.

* * * * *